United States Patent [19]

Ikeda

[11] Patent Number: 5,356,121

[45] Date of Patent: Oct. 18, 1994

[54] FLUID-FILLED CYLINDRICAL ELASTIC MOUNT HAVING ANNULAR PARTITION MEMBER FIXEDLY SUPPORTED IN FLUID CHAMBER FOR PROVIDING RESTRICTED FLOW PASSAGE BETWEEN TWO SECTIONS OF FLUID CHAMBER

[75] Inventor: Katuhisa Ikeda, Kasugai, Japan

[73] Assignee: Tokai Rubber Industries, Ltd., Japan

[21] Appl. No.: 68,107

[22] Filed: May 28, 1993

[30] Foreign Application Priority Data

Jun. 1, 1992 [JP] Japan .................. 4-166991

[51] Int. Cl.$^5$ .............................................. F16M 5/00
[52] U.S. Cl. .......................... 267/140.12; 267/141.2; 248/638
[58] Field of Search ............ 267/140.11, 140.12, 267/141.2, 141.3, 141.4, 35, 219, 152, 293; 248/562, 636, 638; 180/300, 312

[56] References Cited

U.S. PATENT DOCUMENTS

| | | | |
|---|---|---|---|
| 4,530,491 | 7/1985 | Bucksbee et al. | 267/141.2 X |
| 4,883,260 | 11/1989 | Kanda | 248/562 X |
| 4,971,299 | 11/1990 | Doi | 267/140.12 |
| 5,024,461 | 6/1991 | Miyakawa et al. | 267/140.12 X |
| 5,080,330 | 1/1992 | Nanno | 267/140.12 |
| 5,092,565 | 3/1992 | Hamaekers et al. | 267/140.12 |
| 5,123,633 | 6/1992 | Kanda | 267/141.2 X |

FOREIGN PATENT DOCUMENTS

| | | |
|---|---|---|
| 0044908 | 2/1982 | European Pat. Off. . |
| 4015523 | 11/1991 | Fed. Rep. of Germany ... 267/141.3 |
| 61-108689 | 7/1986 | Japan . |
| 3-12641 | 2/1991 | Japan . |

*Primary Examiner*—Robert J. Oberleitner
*Assistant Examiner*—Peter M. Poon
*Attorney, Agent, or Firm*—Parkhurst, Wendel & Rossi

[57] ABSTRACT

A fluid-filled cylindrical elastic mount having an inner and an outer sleeve, an elastic body interposed between these sleeves, an intermediate sleeve fitted on the elastic body and having a pair of windows, an annular fluid chamber extending between the inner and outer sleeves, and an annular partition member disposed in the fluid chamber to divide the chamber into two axial sections and partially define a restricted flow passage which communicates with the two sections. The fluid chamber is formed by a pocket formed in the elastic body, which pocket has first diametrically opposite portions which are open on the intermediate sleeve through the windows, and second diametrically opposite portions which are covered by the intermediate sleeve. The partition member consists of a pair of semi-circular blocks which are assembled together within the pocket such that circumferential end portions of the blocks are located in the second diametrically opposite portions of the pocket and fixedly supported therein by the corresponding portions of the intermediate sleeve.

5 Claims, 4 Drawing Sheets

FLUID-FILLED CYLINDRICAL ELASTIC MOUNT HAVING ANNULAR PARTITION MEMBER FIXEDLY SUPPORTED IN FLUID CHAMBER FOR PROVIDING RESTRICTED FLOW PASSAGE BETWEEN TWO SECTIONS OF FLUID CHAMBER

BACKGROUND OF THE INVENTION

1. Field of the Invention

The present invention relates in general to a fluid-filled cylindrical elastic mount suitably used for flexibly mounting a member of a suspension system of an automotive vehicle on a body of the vehicle, for example, and more particularly to such a fluid-filled cylindrical elastic mount which is capable of effectively damping input vibrations applied in the axial direction of the mount, based on flow of the fluid contained in the mount.

2. Discussion of the Related Art

As one type of a mounting device interposed between two members in a vibration system to connect these two members in a vibration-damping fashion, there is known a cylindrical elastic mount wherein an inner and an outer sleeve are disposed in a radially spaced relationship and are elastically connected by an elastic body interposed therebetween, primarily for damping or isolating vibrations applied between the two sleeves in their axial direction. Such a cylindrical elastic mount is suitably used in automotive suspension systems, for example, as a suspension member mount, a strut-bar cushion, and an upper support.

To meet with an increasing requirement for a cylindrical elastic mount having an improved vibration damping or isolating function, there is recently proposed a fluid-filled cylindrical elastic mount having a chamber which is filled with a fluid and consists of a plurality of sections that are held in fluid communication with each other through a restricted fluid passage or passages. The fluid-filled elastic mount of this type is capable of damping vibrations based on flow of the fluid between the fluid chamber sections through the restricted fluid passage(s).

The assignee of this application proposed one example of the above type of fluid-filled cylindrical elastic mount, as disclosed in laid-open Publication No. 3-12641 of unexamined Japanese Utility Model Application. The proposed elastic mount has a groove-like pocket which is formed in an elastic body connecting inner and outer sleeves, such that the pocket extends over the entire circumference thereof. With this annular pocket closed by the outer sleeve, there is formed an annular fluid chamber, which is divided by an annular partition member into axially opposed two sections. The partition member, which is constituted by a plurality of arcuate or semi-circular blocks, is disposed in the pocket of the elastic body, and is kept in place with its outer circumferential surface supported by the outer sleeve. At the same time, an annular restricted fluid passage is formed between the inner circumferential surface of the partition member and the bottom wall surface of the pocket, such that the restricted fluid passage communicates with the two sections of the fluid chamber.

In the thus constructed fluid-filled cylindrical elastic mount, the annular restricted fluid passage is provided in a radially inner portion of the annular fluid chamber. This means that the restricted fluid passage has a comparatively small circumferential length. Accordingly, the cross sectional area of the restricted fluid passage which permits flow of the fluid therethrough can be sufficiently reduced, without excessively limiting the amount of relative displacement of the inner and outer sleeves in their radial directions. Consequently, the elastic mount provides a sufficiently high damping effect with respect to input vibrations having relatively low frequencies, based on the resonance of the fluid in the restricted fluid passage.

The above-described fluid-filled cylindrical elastic mount is also advantageous in that the axially opposed fluid chamber sections connected by the restricted fluid passage may be easily formed with high efficiency, by inserting the separate blocks of the partition member from the exterior into the pocket, and then fitting the outer sleeve on the partition member and an inner assembly including the elastic body and inner sleeve.

However, further studies by the inventors of the present invention revealed that the fluid-filled cylindrical elastic mount as proposed still has a room for improvements in its structure. Namely, the partition member used in this elastic mount consists of the arcuate or semi-circular blocks, in other words, circumferentially divided blocks, which are separately put into the pocket and assembled together at a radially outer portion of the pocket. During this assembling procedure, it is difficult to maintain the annular shape formed by the blocks thus assembled. This also makes it difficult to fit the outer sleeve onto the outer surface of the partition member while maintaining the annular shape of the partition member formed by the blocks.

Thus, the proposed cylindrical elastic mount is produced with a considerably low efficiency, due to the problem as described above. The production efficiency is also lowered by the above-described process step in which the fitting of the outer sleeve on the inner assembly is effected within a mass of the fluid.

SUMMARY OF THE INVENTION

It is therefore an object of the present invention to provide a fluid-filled cylindrical elastic mount having an improved structure, which can be produced with improved efficiency, with ease of assembling a plurality of blocks which form an annular partition member, within a pocket formed in an elastic body between inner and outer sleeves.

The above object may be attained according to the principle of the present invention, which provides a fluid-filled cylindrical elastic mount, comprising (a) an inner sleeve, (b) an outer sleeve disposed radially outwardly of the inner sleeve with a predetermined radial spacing therebetween, (c) an elastic body interposed between the inner and outer sleeves for elastic connection therebetween, the elastic body having a pocket formed over the entire circumference thereof, which provides an annular fluid chamber filled with a non-compressible fluid and extending between the inner and outer sleeves in a circumferential direction of the mount, the pocket being open on an outer circumferential surface of the elastic body, (d) an annular partition member supported by the outer sleeve and protruding radially inwards from the outer sleeve so as to divide the annular fluid chamber into two sections on axially opposite sides of the partition member, the partition member having an inner circumferential surface which cooperates with an inner wall surface of the fluid chamber to define therebetween an annular restricted flow passage that communicates with the two sections of the fluid chamber, the partition member consisting of a pair of semi-circular blocks, and (e) an intermediate sleeve fixedly fitted on the outer circumferential surface of the elastic body, the intermediate sleeve having a pair of windows which are opposed to each other in a first diametrical direction of the mount, each of the windows extending over less than half of the circumference of the intermediate sleeve, the pocket of the elastic body being open on an outer surface of the intermediate sleeve through the windows at first diametrically opposite portions thereof which are opposed to each other in the first diametrical direction, the pocket being closed by the intermediate sleeve at second diametrically opposite portions thereof which are opposed to each other in a second diametrical direction perpendicular to the first diametrical direction and which are located between corresponding circumferential ends of the windows, the pair of semi-circular blocks of the partition member being received in the pocket such that circumferentially opposite end faces of one of the pair of blocks abut on corresponding circumferential end faces the other block, and such that circumferentially end portions of the blocks are fixedly supported by the intermediate sleeve at the second diametrically opposite portions of the pocket, the outer sleeve being fitted on the intermediate sleeve so that the pocket is fluid-tightly closed by the outer sleeve, so as to form the annular fluid chamber, the pair of semi-circular blocks being supported at outer circumferential surfaces thereof by the outer sleeve to thus form the annular partition member.

In the fluid-filled cylindrical elastic mount constructed as described above according to the present invention, the semi-circular blocks are received in the pocket of the elastic body, and assembled together into the annular partition member, with their circumferential end portions being fixedly supported by diametrically opposite portions of the intermediate sleeve which are located between the corresponding circumferential ends of the windows. Accordingly, it is not necessary to provide means for supporting these blocks in position while the outer sleeve is fitted on the intermediate sleeve and partition member, in order to prevent the blocks from slipping out of the pocket. Thus, the present elastic mount can be produced with significantly improved efficiency, with increased ease of assembling the blocks of the partition member within the pocket which gives the fluid chamber.

BRIEF DESCRIPTION OF THE DRAWINGS

The above and other objects, features and advantages of the present invention will become more apparent by reading the following detailed description of a presently preferred embodiment of the invention, when considered in conjunction with the accompanying drawings, in which.

DETAILED DESCRIPTION OF THE PREFERRED EMBODIMENT

Figure 1:
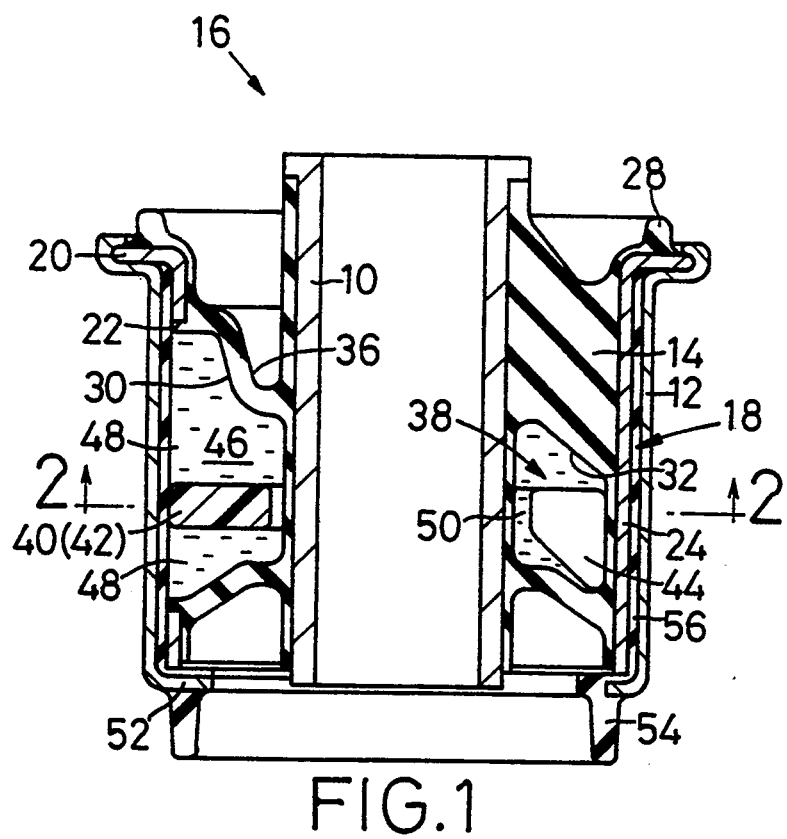
FIG. 1 is an elevational view in cross section taken along line 1—1 of FIG. 2, showing one embodiment of a fluid-filled cylindrical elastic mount in the form of a suspension member mount adapted for use in a suspension system of an automotive vehicle.
Figure 2:
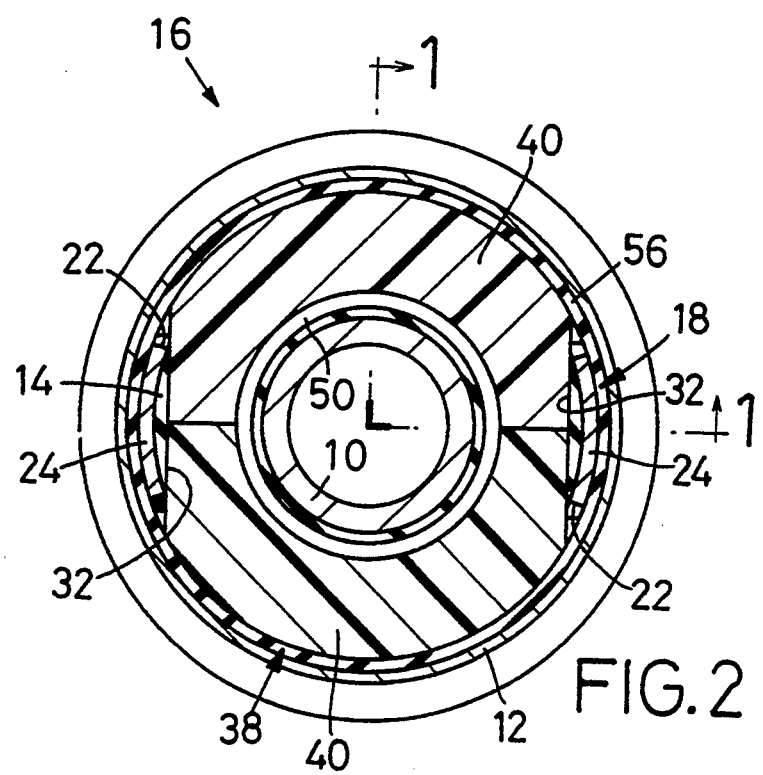
FIG. 2 is a cross sectional view taken along line 2—2 of FIG. 1.
Figure 3:
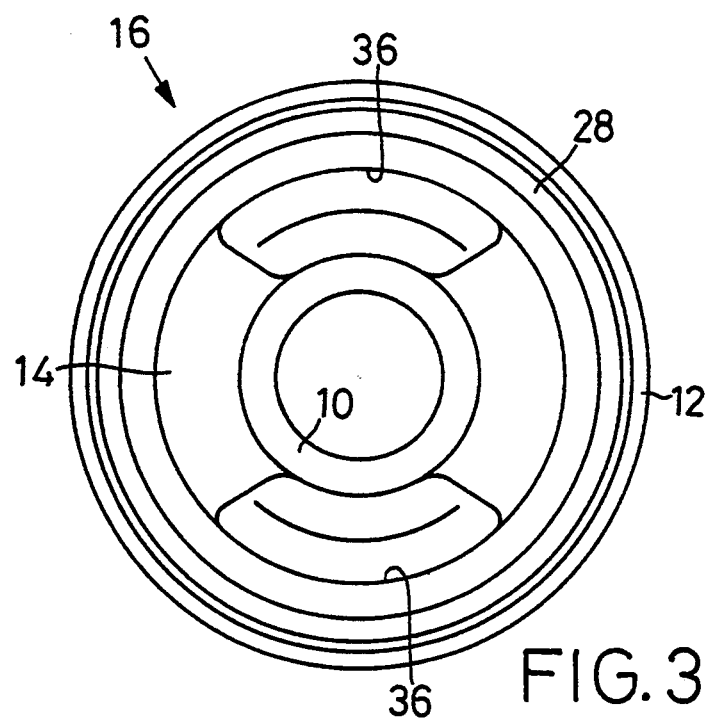
FIG. 3 is a plan view of the suspension member mount of FIG. 1.

Referring first to FIGS. 1 through 3, there is illustrated one preferred embodiment of the fluid-filled cylindrical elastic mount of the present invention, in the form of a suspension member mount 16 adapted to flexibly support a member of a rear suspension system of a motor vehicle. In FIG. 1, reference numerals 10 and 12 respectively denote an inner sleeve and an outer sleeve both made of metal and having a generally cylindrical shape. The inner and outer sleeves 10, 12 are disposed in substantially concentric relation with each other, with a suitable radial spacing therebetween. Between the inner and outer sleeves 10, 12, there is provided an elastic body 14 made of a rubber material, for elastically connecting these two sleeves 10, 12. The thus formed suspension member mount 16 is installed in place such that the inner sleeve 10 is attached to a body of the vehicle while the outer sleeve 12 is attached to the member of the rear suspension system, so as to flexibly support the suspension member on the vehicle body.

Radially outwardly of the inner sleeve 10, an intermediate metallic sleeve 18 is disposed substantially coaxially with the inner sleeve 10, such that these sleeves 10, 18 are radially spaced a suitable distance apart from each other.

The intermediate sleeve 18 is a thin, cylindrical metallic member, which has a cylindrical wall and an outward flange 20 extending radially outwards from one axial end of the cylindrical wall. A pair of windows 22, 22 are formed in axially middle portions of the cylindrical wall of the intermediate sleeve 18, such that each window 22 extends in the circumferential direction of the sleeve 18, over a little less than half of the circumference thereof, and such that the windows 22, 22 are opposed to each other in a diametrical direction of the sleeve 18. In other words, the intermediate sleeve 18 has axially opposite end portions having a cylindrical or annular shape, and axially intermediate connecting portions 24, 24 for integrally connecting these axial end portions with each other. The connecting portions 24, 24 have a suitable axial length and are opposed to each other in a diametrical direction perpendicular to the above-indicated diametrical direction.

Figure 4:
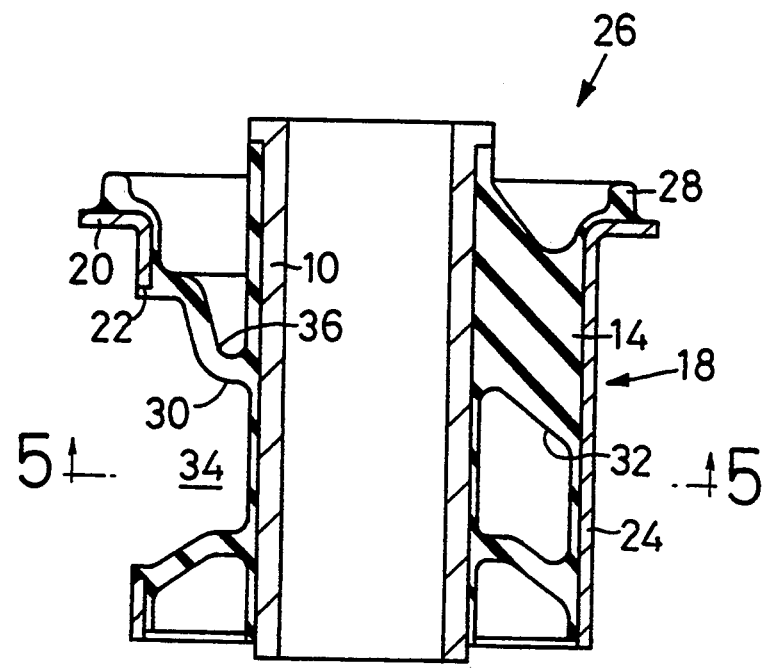
FIG. 4 is a cross sectional view taken along line 4—4 of FIG. 5, showing an inner assembly which forms a part of the suspension member mount of FIG. 1.
Figure 5:
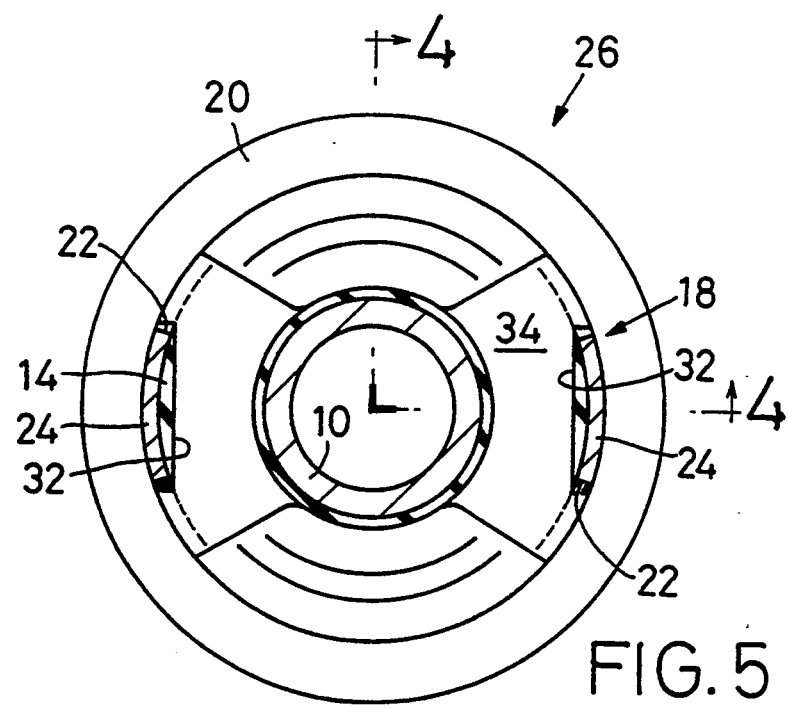
FIG. 5 is a cross sectional view taken along line 5—5 of FIG. 4.

As shown in FIGS. 4 and 5, the elastic body 14 is interposed between the inner sleeve 10 and the intermediate sleeve 18 so as to elastically connect these sleeves 10, 18 with each other. This elastic body 14 has a generally cylindrical shape with a relatively large thickness, and is secured at its inner circumferential surface to the inner sleeve 10 and at its outer circumferential surface to the intermediate sleeve 18, by vulcanization. Thus, there is formed an inner assembly 26 as shown in FIG. 4, which consists of the inner sleeve 10, elastic body 14 and intermediate sleeve 18. Annular buffer rubber layer 28 is formed on the outer face of the outward flange 20 of the intermediate sleeve 18, so as to protrude a suitable distance axially outwards from the flange 20.

The elastic body 14 has two recesses 30, 30 formed in its axially intermediate portions which are aligned with the above-indicated windows 22, 22 of the intermediate sleeve 18. The recesses 30, 30 are open on the outer circumferential surface of the elastic body 14 through the respective windows 22, 22. Between the corresponding circumferential ends of the two recesses 30, 30, there is formed a tunnel-like communication passage 32 which extends between the inner sleeve 10 and the intermediate sleeve 18 in the circumferential direction, so as to communicate with the recesses 30, 30. Namely, two communication passages 32, 32 are respectively formed in diametrically opposite portions of the elastic body 14 which are located between the recesses 30, 30 as viewed in the circumferential direction. Thus, the inner assembly 26 is provided with an annular pocket 34 which is formed by these recesses 30, 30 and communication passages 32, 32 and which extends around the inner sleeve 10.

The elastic body 14 has a pair of hollow portions 36, 36 formed in its diametrically opposite portions that are aligned with the recesses 30, 30 as viewed in the axial direction, so as to extend axially inwards from one axial end of the elastic body 14 over a suitable axial length. With the hollow portions 36, 36 thus formed, the spring constant of the elastic body 14 as measured in the diametrical direction in which the hollow portions 36, 36 are opposed to each other is made smaller than the spring constant of the same as measured in the diametrical direction perpendicular to the above-indicated diametrical direction.

Figure 6:
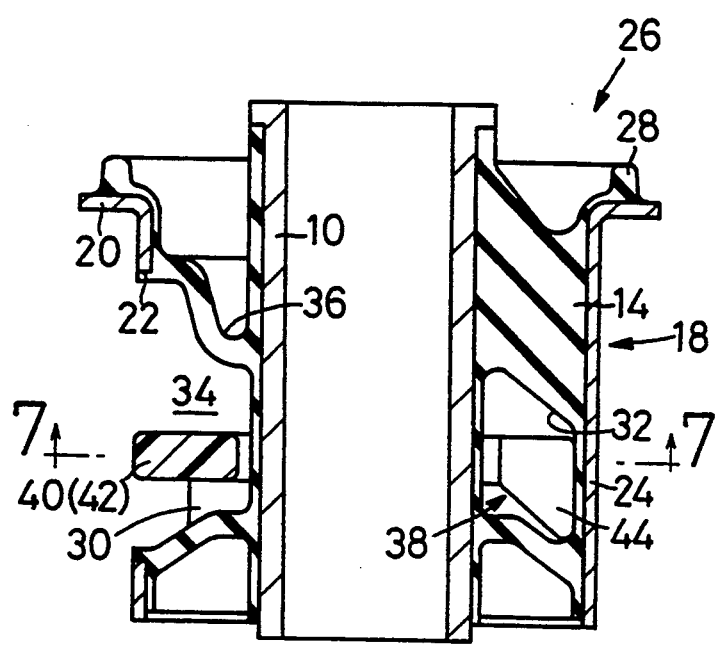
FIG. 6 is a cross sectional view taken along line 6—6 of FIG. 7, showing the inner assembly of FIG. 4 when it is assembled with a partition member.
Figure 7:
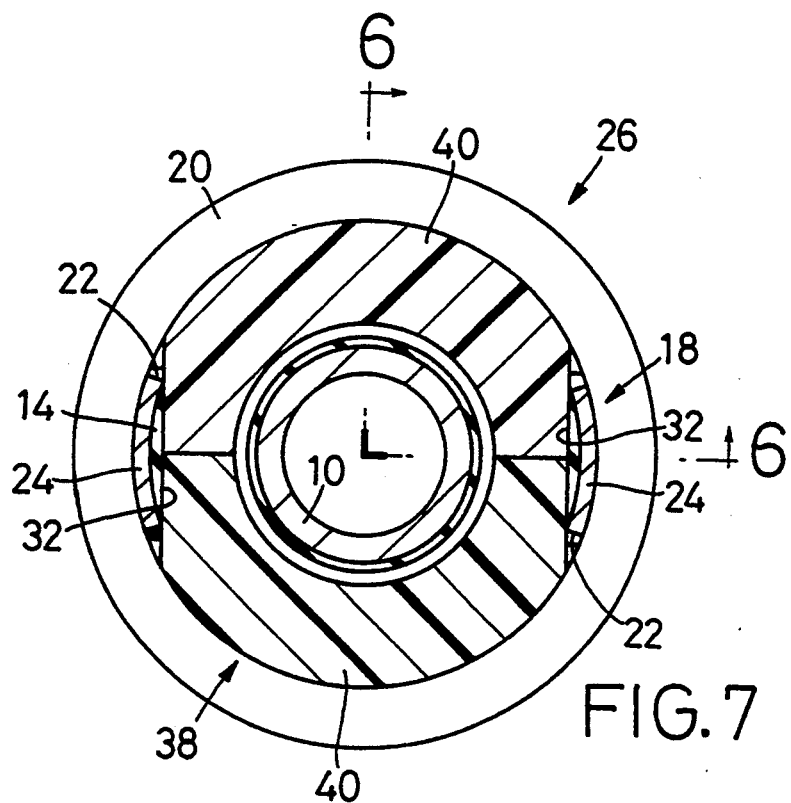
FIG. 7 is a cross sectional view taken along line 7—7 of FIG. 6.
Figure 8:
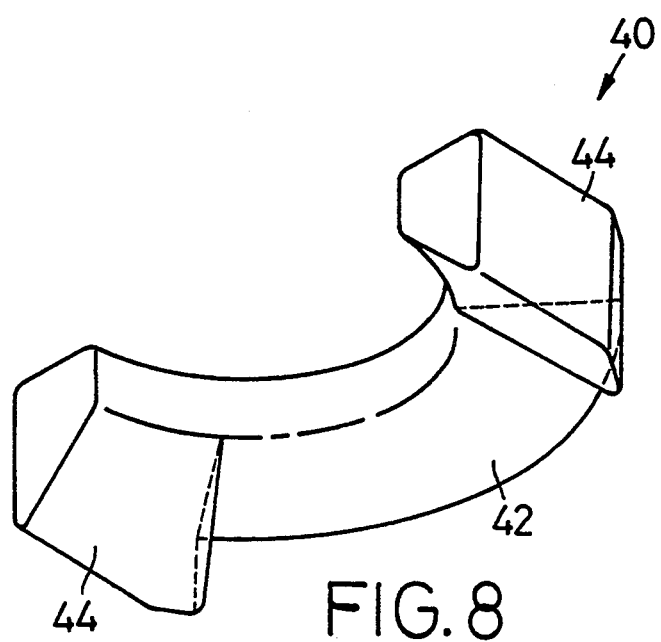
FIG. 8 is a perspective view showing one of the blocks of the partition member used in the suspension member mount of FIG. 1.

After the diameter of the intermediate sleeve 18 is reduced as needed, the inner assembly 26 constructed as described above is provided with a pair of generally semi-circular blocks 40, 40, which are placed in the pocket 34 as shown in FIGS. 6 and 7. Each of the blocks 40 includes a circumferentially intermediate arcuate portion 42 having a constant thickness, and thick-walled portions 44, 44 formed on circumferentially opposite sides of the arcuate portion 42 and having a varying thickness which increases toward the outer circumferential surface of the block 40.

The inner circumferential surface of the block 40 has a radius of curvature which is larger than that of the bottom wall surface of the pocket 34 of the inner assembly 26. The arcuate portion 42 of the block 40 has an outside diameter which is substantially equal to that of the intermediate sleeve 18 of the inner assembly 26, and the thick-walled portions 44 of the block 40 have an outside diameter which is substantially equal to that of the communication passages 32 of the inner assembly 26.

The pair of semi-circular blocks 40, 40 are mounted on the inner assembly 26 by inserting the blocks 40 into the pocket 34 through the windows 22, 22 of the intermediate sleeve 18, such that the corresponding circumferential end faces of the blocks 40 abut on each other. With the blocks 40 thus mounted in place, the thick-walled portions 44 of each block 40 are fitted in the communication passages 32 of the inner assembly 26, such that the thick-walled portions 44 are secured at their outer circumferential surfaces to the corresponding inner walls of the passages 32.

With the semi-circular blocks 40, 40 mounted as described above and retained in position, these blocks 40, 40 constitute an annular partition member 38 whose inner circumferential surface is radially spaced a suitable distance apart from the bottom wall of the pocket 34.

After the mounting of the partition member 38 as described above, the outer sleeve 12 is disposed on the inner assembly 26, and is drawn radially inwards using eight dies, so that the outer sleeve 12 is fixedly fitted on the outer circumferential surface of the intermediate sleeve 18, as shown in FIGS. 1 through 3. The outer sleeve 12 has an inward flange 52 formed at one axial end thereof so as to abut on an axial end face of the intermediate sleeve 18 remote from the outward flange 20. The outer sleeve 12 is caulked at the other axial end thereof against the outward flange 20 of the intermediate sleeve 18. On the outer surface of the inward flange 52 of the outer sleeve 12, there is formed an annular buffer rubber layer 54 which protrudes a suitable distance axially outwards from the flange 52.

With the outer sleeve 12 thus mounted in position, the openings of the pocket 34 (i.e., windows 22, 22) are fluid-tightly closed by the outer sleeve 12, whereby an annular fluid chamber 46 filled with a suitable non-compressible fluid is formed in the member mount 16. In this condition, the blocks 40, 40 of the partition member 36 are supported at their outer surfaces by the outer sleeve 12. A sealing rubber layer 56 is formed to cover almost the entire area of the inner circumferential surface of the outer sleeve 12, and is compressed against the intermediate sleeve 18.

For example, water, alkyléne glycol, polyalkylene glycol and silicone oil are preferably used as the above non-compressible fluid. The filling of the fluid chamber 46 with a selected non-compressible fluid may be effected by fitting the outer sleeve 12 on the inner assembly 26 within a mass of the selected non-compressible fluid.

The thus formed fluid chamber 46 is substantially divided by the partition member 38 into two fluid sections 48, 48 on the axially opposite sides of the partition member 38. Between the inner circumferential surface of the partition member 38 and an inner wall portion of the fluid chamber 46 which faces the partition member 38 in the radial directions, there is formed an annular restricted fluid passage 50 which communicates with the two fluid sections 48, 48 so as to permit the fluid to flow between these sections 48, 48. When a vibrational load is applied between the inner and outer sleeves 10, 12 in the axial direction of the mount 16, therefore, the partition member 38 is displaced or oscillated in the axial direction within the fluid chamber 46, whereby the fluid is forced to flow between the fluid sections 48, 48 through the restricted fluid passage 50. As a result, the suspension member mount 16 provides a desired vibration damping effect with respect to the input vibrations, based on the resonance of the fluid in the restricted fluid passage 50.

When a large vibrational load is applied between the inner and outer sleeves 10, 12 in a radial direction of the mount 16, the partition member 38 abuts on the inner sleeve 10, to thereby avoid an excessively large relative displacement of the inner and outer sleeves 10, 12 in the radial direction. Thus, the partition member 38 effectively serves as a stopper for preventing excessively large displacement of the inner and outer sleeve 10, 12, upon application of vibrations in radial directions.

For fabricating the suspension member mount 16 constructed as described above, the semi-circular blocks 40 of the partition member 38 are initially mounted in the pocket 34 of the inner assembly 26, and the outer sleeve 12 is then fitted onto the inner assembly 26. During this assembling procedure, the blocks 40 are favorably retained in position with respect to the inner assembly 26, with the thick-walled portions 44 of the blocks 40 supported by the intermediate sleeve 18 and retained in the communication passages 32 formed in the inner assembly 26. Accordingly, it is not necessary to provide means for supporting the blocks 40 in position while the outer sleeve 12 is fitted on the inner assembly 26, in order to prevent the blocks 40 from slipping out of the pocket 34 of the inner assembly 26.

In this manner, the semi-circular blocks 40, 40 and the outer sleeve 12 are assembled with the inner assembly 12 with remarkably improved efficiency, whereby the present suspension member mount 16 is produced with an accordingly improved efficiency.

While the present invention has been described in its presently preferred embodiment for illustrative purpose only, it is to be understood that the invention is not limited to the details of the illustrated embodiment, but may be otherwise embodied.

For instance, the shape of the partition member 38 is never limited to that of the illustrated embodiment, but may be changed as needed, depending upon the shape of the communication passages 32 formed in the inner assembly 26, shape of the fluid chamber 46, required vibration damping characteristics of the member mount, and other factors. It is also possible to form a partition member having the same cross section along the entire circumferential length thereof.

In the illustrated embodiment, the hollow portions 36, 36 formed in the elastic body 14 serve to give different spring characteristics to the elastic body 14 with respect to vibrations applied in different diametrical directions of the member mount 16. However, the hollow portions 36, 36 are not necessarily formed, but may be provided as needed depending upon required vibration damping characteristics of the member mount 16.

While the suspension member mount 16 of the illustrated embodiment of the present invention is adapted to flexibly support a member of a suspension system of an automotive vehicle, the principle of this invention is equally applicable to other types of a fluid-filled cylindrical elastic mount, such as a strut-bar cushion and a body mount for automotive vehicles, and an upper support for a vehicle suspension system, and is also applicable to other cylindrical elastic mounts used with various devices or equipment other than those used in automotive vehicles.

It is to be understood that the present invention may be embodied with various other changes, modifications and improvements, which may occur to those skilled in the art, without departing from the spirit and scope of the invention defined in the following claims.

What is claimed is:

1. A fluid-filled cylindrical elastic mount, comprising:
   an inner sleeve;
   an outer sleeve disposed radially outwardly of said inner sleeve with a predetermined radial spacing therebetween;
   an elastic body interposed between said inner and outer sleeves for elastic connection therebetween, said elastic body having a pocket formed over the entire circumference thereof, which provides an annular fluid chamber filled with a non-compressible fluid and extending between said inner and outer sleeves in a circumferential direction of the mount, said pocket being open on an outer circumferential surface of said elastic body;
   an annular partition member supported by said outer sleeve and protruding radially inwards from the outer sleeve so as to divide said annular fluid chamber into two sections on axially opposite sides of said partition member, said partition member having an inner circumferential surface which cooperates with an inner wall surface of said fluid chamber to define therebetween an annular restricted flow passage that communicates with said two sections of said fluid chamber, said partition member consisting of a pair of semi-circular blocks; and
   an intermediate sleeve fixedly fitted on said outer circumferential surface of said elastic body, said intermediate sleeve having a pair of windows which are opposed to each other in a first diametrical direction of the mount, each of said windows extending over less than half of the circumference of the intermediate sleeve, said pocket of said elastic body being open on an outer surface of said intermediate sleeve through said windows at first diametrically opposite portions thereof which are opposed to each other in said first diametrical direction, said pocket being closed by said intermediate sleeve at second diametrically opposite portions thereof which are opposed to each other in a second diametrical direction perpendicular to said first diametrical direction and which are located between corresponding circumferential ends of said windows, said pair of semi-circular blocks of said partition member being received in said pocket such that circumferentially opposite end faces of one of said pair of blocks abut on corresponding circumferential end faces the other block, and such that circumferentially end portions of said blocks are fixedly supported by said intermediate sleeve at said second diametrically opposite portions of said pocket, said outer sleeve being fitted on said intermediate sleeve so that said pocket is fluid-tightly closed by the outer sleeve, so as to form said annular fluid cheer, said pair of semi-circular blocks being supported at outer circumferential surfaces thereof by said outer sleeve to thus form said annular partition member.

2. A fluid-filled elastic mount according to claim 1, wherein said pocket is formed in an axially middle portion of said elastic body.

3. A fluid-filled elastic mount according to claim 1, wherein each of said pair of semi-circular blocks includes a circumferentially intermediate arcuate portion having a constant thickness, and circumferentially opposite end portions having a thickness which increases toward the outer circumferential surface of said each block.

4. A fluid-filled elastic mount according to claim 1, wherein said elastic body has a pair of hollow portions formed in diametrically opposite portions thereof which are opposed to each other in said first diametrical direction of the mount, said hollow portion extending axially inwards from one of opposite axial ends of said elastic body.

5. A fluid-filled elastic mount according to claim 1, further comprising a sealing rubber layer disposed under pressure between said intermediate sleeve and said outer sleeve, for sealing said annular fluid chamber.

* * * * *